United States Patent
Ruitenbeek

(10) Patent No.: US 6,854,159 B2
(45) Date of Patent: Feb. 15, 2005

(54) SWIVEL CASTER

(75) Inventor: Cornelis Hendrik Ruitenbeek, LW at Doorn (NL)

(73) Assignee: Colson Transportwielen B.V., Veenendal (NL)

( * ) Notice: Subject to any disclaimer, the term of this patent is extended or adjusted under 35 U.S.C. 154(b) by 4 days.

(21) Appl. No.: 10/178,901

(22) Filed: Jun. 21, 2002

(65) Prior Publication Data

US 2003/0090075 A1 May 15, 2003

(30) Foreign Application Priority Data

Jun. 22, 2001 (NL) .............................................. 1018366

(51) Int. Cl.⁷ .............................................. B60B 33/00
(52) U.S. Cl. .................... 16/18 R; 16/42 R; 16/18 CG; 16/46
(58) Field of Search .......................... 16/42 R, 18 CG, 16/45, 46, 20; 248/188.9, 346.11; 193/35 MD, 37, 35 B, 38

(56) References Cited

U.S. PATENT DOCUMENTS

| | | | | | |
|---|---|---|---|---|---|
| 2,088,093 A | * | 7/1937 | Richter | .......................... | 193/37 |
| 3,466,697 A | * | 9/1969 | Goodrich et al. | .............. | 16/26 |
| 3,739,894 A | * | 6/1973 | Hinman | ................. | 193/35 MD |
| 4,125,183 A | * | 11/1978 | Lang | ............................ | 193/37 |
| 4,316,305 A | * | 2/1982 | Seaford | .......................... | 16/21 |
| 4,696,583 A | * | 9/1987 | Gorges | ........................ | 384/49 |
| 5,076,412 A | * | 12/1991 | Huber | ................... | 193/35 MD |
| 5,097,565 A | * | 3/1992 | Shorey | ........................... | 16/48 |
| 5,134,753 A | * | 8/1992 | Rekuc | ....................... | 16/18 CG |
| 5,219,058 A | * | 6/1993 | Sundseth | .............. | 193/35 MD |
| 5,655,259 A | | 8/1997 | Look | | |
| 6,223,388 B1 | | 5/2001 | Sey | | |
| 6,244,417 B1 | | 6/2001 | Timmer et al. | | |
| 6,604,258 B2 | * | 8/2003 | Saggio et al. | ................... | 16/48 |

FOREIGN PATENT DOCUMENTS

| | | |
|---|---|---|
| DE | 197 20 224 | 10/1998 |
| EP | 0 152 157 | 8/1985 |
| JP | 10109710 A * | 4/1998 ............ B65G/1/08 |

* cited by examiner

Primary Examiner—Chuck Y. Mah
(74) Attorney, Agent, or Firm—Knobbe, Martens, Olson & Bear, LLP

(57) ABSTRACT

A swivel caster suitable to be mounted in a transportation system wherein the caster includes a wheel secured on a shaft by means of a first roller bearing, the shaft being attached near its ends to the legs of a swivel fork having a body or supporting element connected with a casing of a second roller bearing such that the casing can be mounted on the transportation system. The transportation system includes a supporting platform composed of upper and lower plates wherein the caster wheel partly extends from the upper plate and wherein the bearing casing can be mounted on the bottom plate. The swivel caster is completely mounted in a device having an opening with a rim that can be connected on the upper plate such that replacement of a swivel caster can be carried out solely by removing the device from the upper platform.

9 Claims, 4 Drawing Sheets

SWIVEL CASTER

RELATED APPLICATIONS

This application claims the benefit of the Dutch application number 1018366 filed Jun. 22, 2001 in the Netherlands Patent Office.

BACKGROUND OF THE INVENTION

1. Field of the Invention

The invention relates to a swivel caster suitable to be mounted in a transportation system wherein the caster includes a wheel secured on a shaft by means of a first rolling bearing, said shaft being attached near its ends to the legs of a swivel fork including a body or supporting-element connected with a casing of a second rolling bearing wherein the casing can be mounted on said transportation system wherein the system includes a supporting or upper platform from which said caster wheel partly extends and a bottom platform on which said bearing casing can mounted.

2. Description of the Related Art

Such a swivel caster is known from the Dutch patent application 84 00460. This disclosure teaches that, for instance with transportation of relatively large and often heavy containers, a transportation system is used, a so-called roller platform. This system comprises a supporting structure whereupon swivel casters are mounted with the rolling bearings on the bottom platform of such system. Above this bottom platform a deck or upper platform is mounted from which only part of the swivel casters wheels extend and along which the transport or transfer of freight, respectively, will be carried out.

This transportation system or roller platform is particularly suitable for loading and/or unloading of cargo-planes when it must be possible to easily transfer the relatively heavy and often sizeable cases or containers in horizontal directions. The wheels of the swivel casters will actually rotate around a vertical axle over a certain distance, which axle is also the axle of a rolling bearing which is connected to the bottom platform. However, with the known transportation system this connection leads to problems which are mainly caused by the facts that;

- bolt connections with the bottom platform are applied which means that during the assembling procedure the fact must be taken into consideration that the can accessibility of the platform-construction is limited;
- the replacement of swivel casters must often be carried out by force, since the bolt connections may have corroded during operation;
- the accessibility of the swivel casters that must be assembled is often seriously hindered by the platform design and the corroded bolt connections that are drawn to pieces.

SUMMARY OF THE INVENTION

The invention now overcomes the problems as mentioned and therefore is characterized in that said swivel caster being completely mounted in a device which opening has a rim that can be connected on said upper platform. Due to this measure the favourable effect has been achieved that e.g. mounting and/or dismounting of swivel casters from the transportation system will only be carried out by removing the device which thus contains a swivel caster, from said upper platform. Fact is that replacing the casters from the transportation system can now be carried out in an efficient and effective way.

According to a preferred embodiment of the invention the device forms a deepened block-shaped element, in which a rolling bearing being the swivel bearing is mounted on its bottom and wherein its open end is largely covered by a is plate which is connected with the wheel-shaft. In this manner, depending on the type of transportation system, a device can be designed having a suitable shape to be applied in this specific system. Actually a randomly shaped device containing said caster, respectively, can be applied.

According to a favorable embodiment of the invention said device in cross-section has the shape of a relatively thin-walled bowl, pot or the like which at its open end is provided with an outer edge having means due to which said device can be connected with the upper platform of the system.

Due to this measure a relatively light but sufficiently stiff combination of a device and swivel caster is obtained whereby this combination can easily be placed in the upper platform of the transportation system. The device can be secured on the platform e.g. by bolt connections or other means of attachment whereto openings in the edge are available.

Another efficient embodiment according to the invention is characterized in that the bottom of the element is provided with openings having edges which are clamped or tightened around the edge of the top plate or outer casing of the rolling bearing such that the swivel caster is fastened in the device. This embodiment offers the advantages as no extra means of attachment, for instance bolts, are required anymore. Moreover, via said openings, dirt, water and the like can drain off, so that functioning of the swivel caster mechanism will not be influenced negatively.

An embodiment according to the invention which the swivel fork is used in a favorable manner is characterized in that a safety or protection plate is part of the supporting element of the swivel fork as well as being part of the connection to the shaft of said swivel wheel. It is further noted that the wheel-shaft to which the protection plate is attached is located within the device. Application of such protection plates on the swivel casters reduces damage to shoes or perhaps even injuries to a persons foot due to a space between the swiveling wheels and the wall of the device which thus is now covered by such a plate. Moreover, this plate inhibits dirt and the like from the platform surface from being pushed into the swivel caster.

An advantageous embodiment according to the invention is characterized in that the outer ring of the second rolling bearing which is arranged in the bottom of the device is connected to a top plate or bearing outer casing of said swivel caster having an edge fastened to the bottom of the device. Moreover, the outer ring of this rolling bearing at its bottom is supported by a locking cap due to which measure dirt and the like which could enter in the bottom of the device via the openings of the device is inhibited from entering the rolling bearing.

BRIEF DESCRIPTION OF THE DRAWINGS

The invention will be further explained by the figures due to which advantages and other features of the invention will become clear:

FIG. 2 is a perspective view of the combination of a swivel caster and the device according to the invention, FIG. 3 is a cross-sectional view of the swivel caster and device according to FIG. 2;

DETAILED DESCRIPTION OF THE PREFERRED EMBODIMENTS

Figure 1:
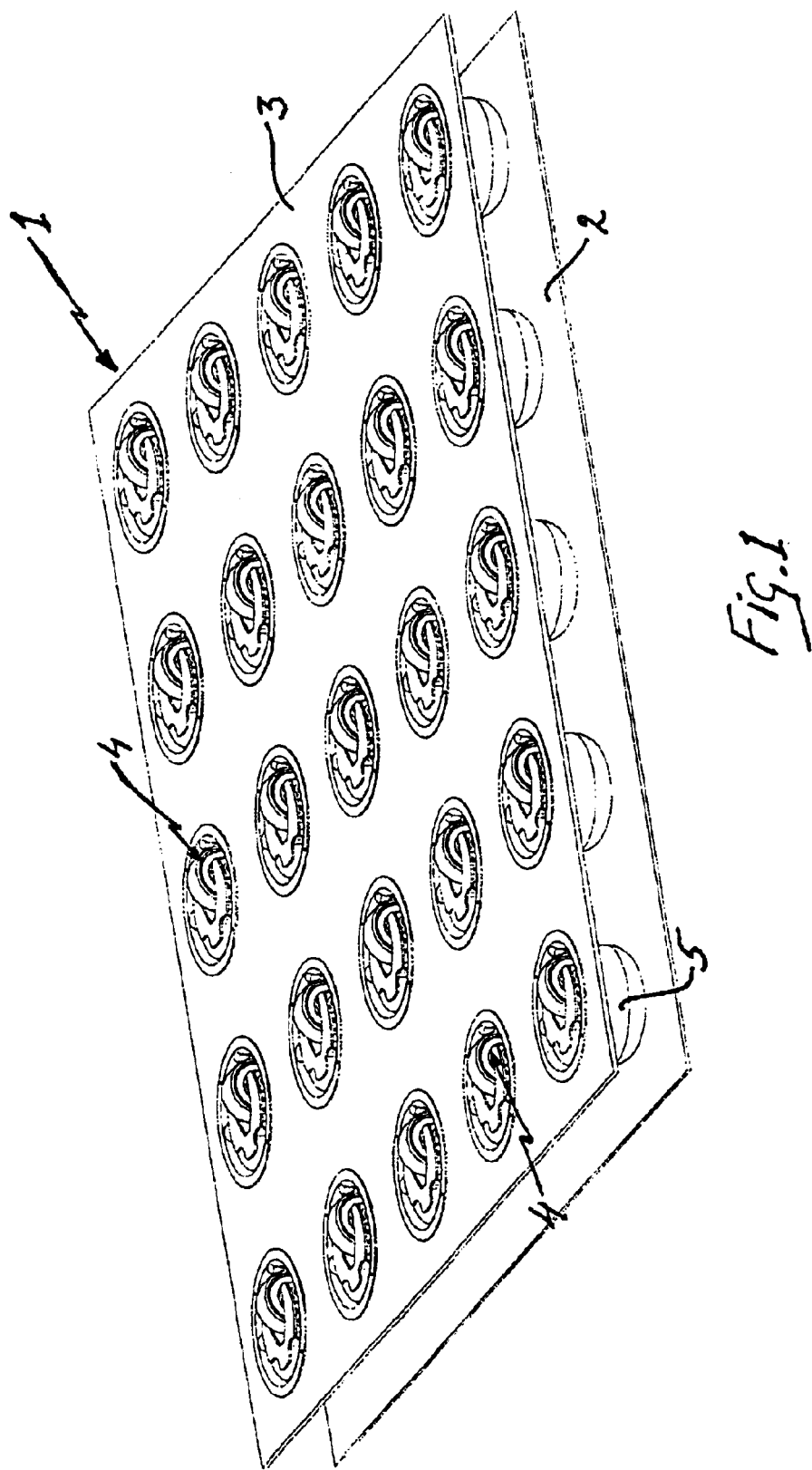
FIG. 1 is a perspective view of a part of a transportation system provided with the swivel caster and the device according to the invention.

It is noted that for the same elements as shown in the figures also the same numbers will be applied. According to FIG. 1 a part of a transportation system, a so-called roller platform 1 is shown in perspective. Such a platform, suitable for shipping of heavy crates or containers, is usually constructed according to a specially assembled bearing system and/or framework. To this purpose the system comprises a bottom platform 2 and an upper platform 3. For transportation of the freight swivel casters 4 are preferably mounted at regular distances from each other in the upper platform 1. According to the invention the complete swivel casters 4 are now nearly fully enclosed in the devise 5 which is mounted in said upper platform 3. According to FIG. 2 devise 5 according to its cross sectional view mainly has the shape of a pot or bowl which open end 13 is provided with an edge 6. In this edge holes 7 are applied which are suitable to be used as bolt or screw connections. According to the invention in the transportation system 1 the edge 6 of the devise 5 is applied on to the upper platform 3 and it may be fastened on it by bolts (not shown). In the devise 5 the swivel caster 8 is mounted such that only a part of the wheel 9 extends outside the surface of said upper platform. Generally the wheel-shaft 10 is at some distance below the surface of the upper platform 3. Over wheels 9, as known, freights can be moved in various directions. Preferable a wheel 9 is applied on its shaft 10 by a rolling bearing, see in particular FIG. 7 part 47. This shaft further is part of a swivel fork 11, see also FIG. 3. According to the invention in this embodiment from the swivel fork 11 a protection or safety plate 12 is developed which design will be discussed during the explanation of FIG. 3.

The plate 12 offers a protection against e.g. foot injuries of persons working at the loading stations where these transportation systems are in operation or falling dirt and the like into the swivel casters which will certainly block the function of the system. The plate 12 closes for a great part the devise opening 13. This plate has towards the wheel 9 some cut outs on to which the plate parts 12a, 12b are attached to the shaft 10. By this plate embodiment wheel 9 can continuously freely swivel around its swivel axle 14 as well as plate 12.

Figures 2, 3:
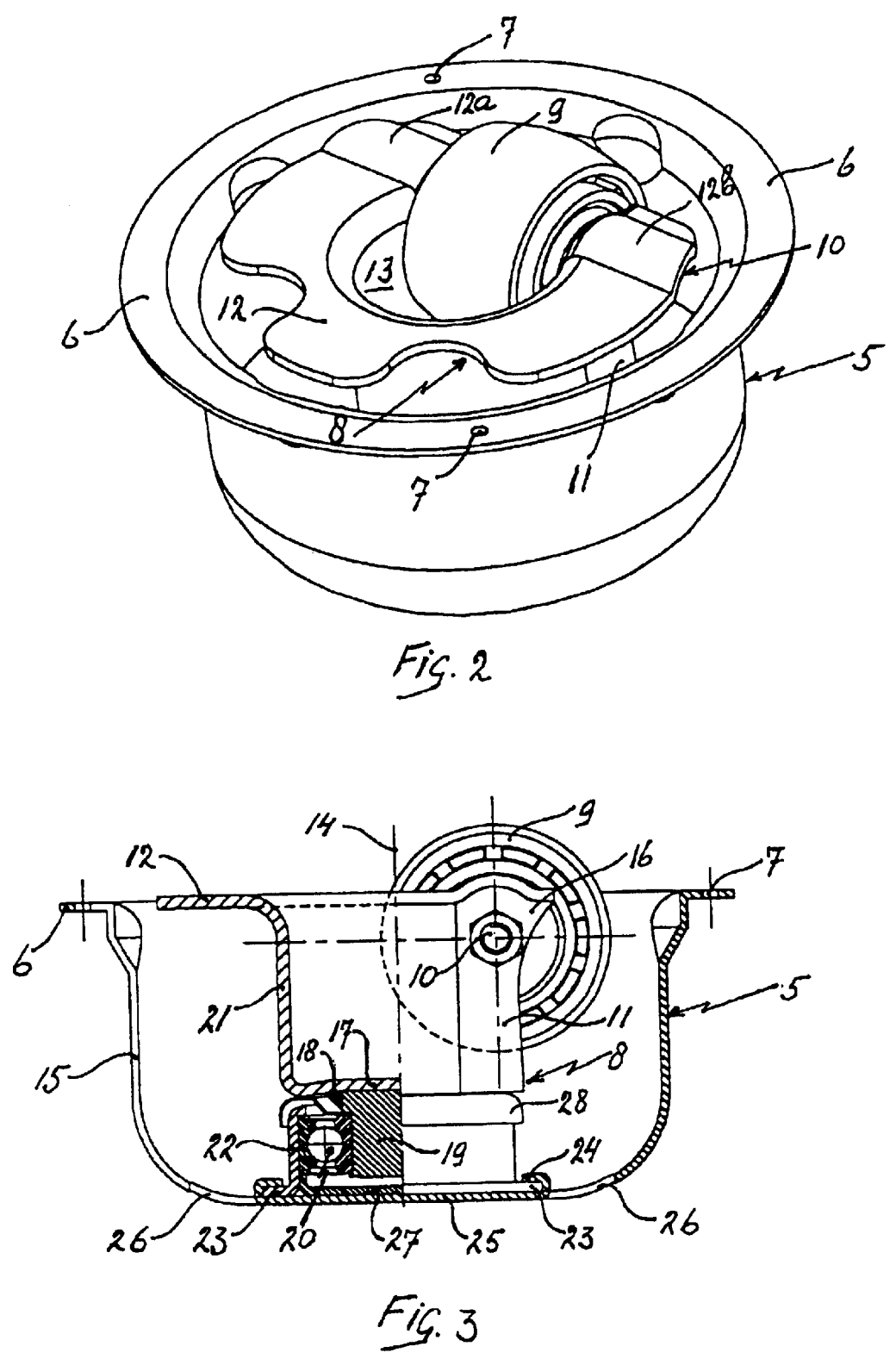

FIG. 3 shows the cross-section over the combination of devise 5 and swivel caster 8 such as it is mounted in the roller-platform 1. Devise 5 which has the shape of a bowl or pot which is executed with a relatively thin wall 15. The combination is therefor relatively light in weight and due to its shape sufficiently stiff. The wheel 9 is applied on the shaft 10 which is attached with the legs 16 of fork 11. The body or supporting element 17 of the fork is fastened to the journal 19 of the rolling bearing 20 by a welded seam 18.

According to the invention, the protection plate 12 is developed from the element 17 in a running plate part 21, preferably parallel to the wall 15 of the bowl-shaped devise 5 and passes into the horizontal plate part 12. This part further is directed towards and approximately being in the same plane as the edge 6 of the devise 5. According to the embodiment of FIG. 2 the casing of the rolling bearing 20 is formed by the journal 19 and a so-called top plate 22 which at its bottom comprises an edge 23. According to the invention the attachment of the rolling bearing 20 is effected in the devise 5 by bending the edges 24 of openings 26 formed in the bottom 25 around the edge 23 of said top plate 22 and pressing them against this edge.

Another advantage of this bottom construction is characterized in that dirt and/or moisture that have fallen into the combined caster/devise 8,5 can be discharged along these openings 26. To strengthen this attachment a cap or ring 27 is applied additionally which lies against the outer bearing ring of the rolling bearing 20. By these measures a reliable rolling bearing attachment of the combination 5,8 is guaranteed. The rolling bearing 20 is further closed by a sealing means 28.

In the embodiment according to FIGS. 2 and 3 the plate 12 is attached to the journal 19 via the welded seam 18 and therefore forms an integrated protection plate of the combination swivel caster/devise 8,5.

Figure 4:
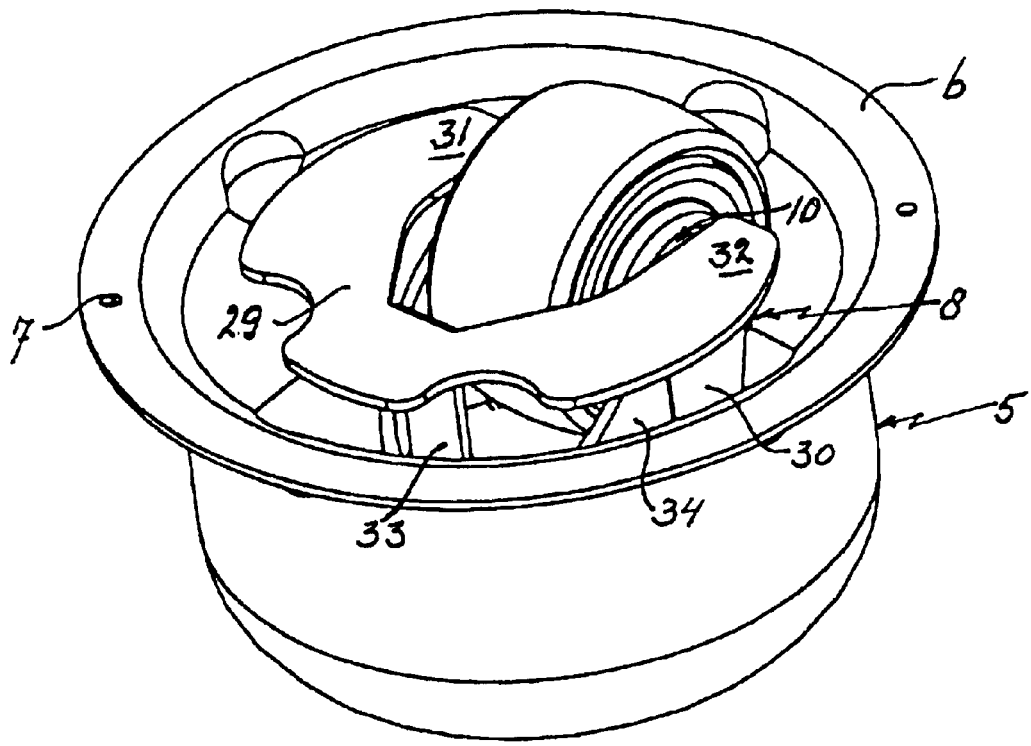
FIG. 4 is a perspective view of another combination of a swivel castor/device arrangement.
Figure 5:
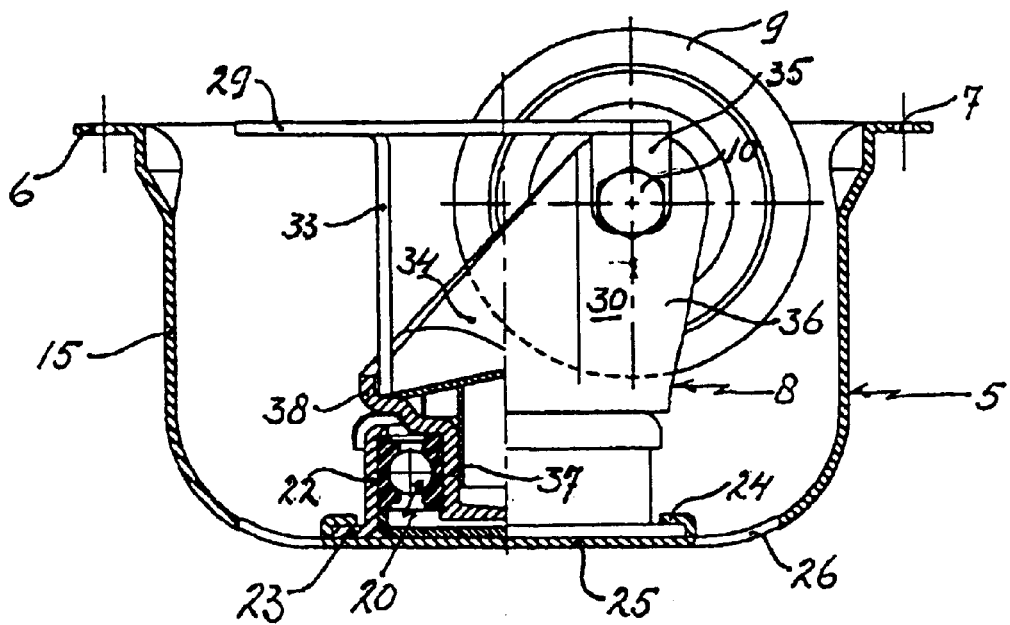
FIG. 5 is a cross-sectional view of the combination according to FIG. 4.

FIG. 4 shows in perspective especially a different shape of the protection plate 29 and swivel fork 30 as well. Plate 29 is connected with its ends 31, 32 to the wheel shaft 10 and the plate therefore can swivel along with the wheel 9. The other side of plate 29 that is directed away from wheel 9 is connected with the body or supporting element 34 of the swivel fork 30 and on one side supported by strips 33. The design of swivel fork 30 that is adjusted thereto, particularly the body 34 with regard to its strips 33, will be further explained by the description of FIG. 5. According to the embodiment of FIG. 5 the swivel fork 30 is also assembled by the body 34 and its legs 36 however, of a somewhat different shape. On the legs 36 the wheel shaft 10 is mounted on which the end parts 31, 32 of safety-plate 29 are attached by means of a connecting piece 35. A part of the rolling bearing casing is formed by a part 37 of the body 34 to which the inner ring of the bearing 20 is fixed. The outer ring of the bearing 20 is also fixed by the top plate 22 such as in the embodiment according to FIGS. 2 and 3. The body part 37 is then extended in a bent edge part 38 against which ends of the strips 33 lie or press. The pressing force is here determined by the direction and the attachment of the plate 29 on the wheel shaft 10. Contrary to the embodiment according to the FIGS. 2 and 3 in which the protection plate 12 is tightly attached to the journal 19 of the rolling bearing, according to the embodiment of the FIGS. 4 and 5 the protection plate 29 is detachably connected with the shaft 10 and body 34 of the swivel fork 30.

Figure 6:
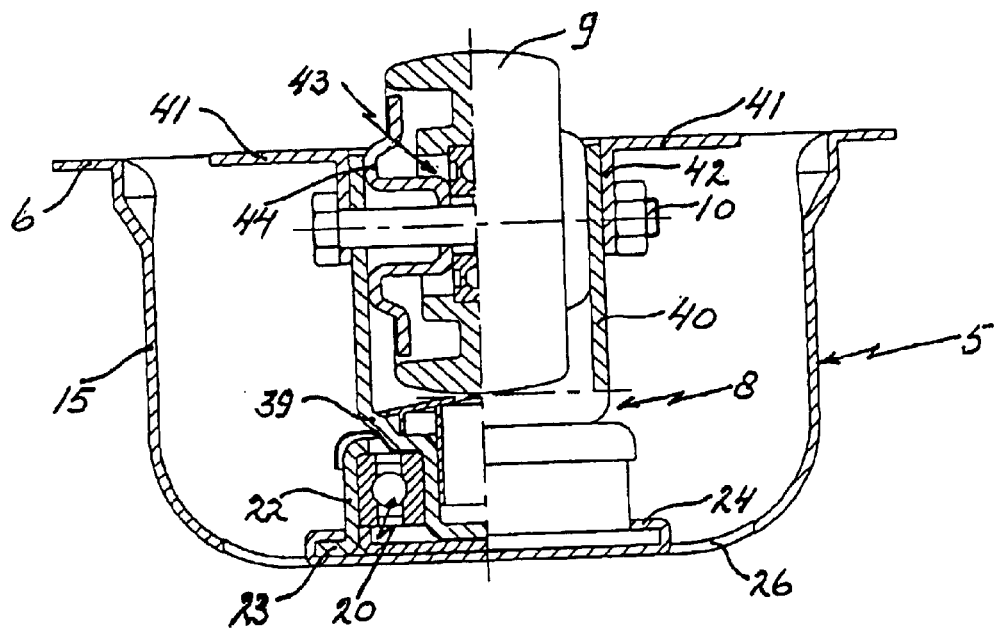
FIG. 6 is a cross-sectional view of a combination swivel caster/device which caster wheel on its rolling bearing and the detachable protection plate both being applied on the same shaft.
Figure 7:
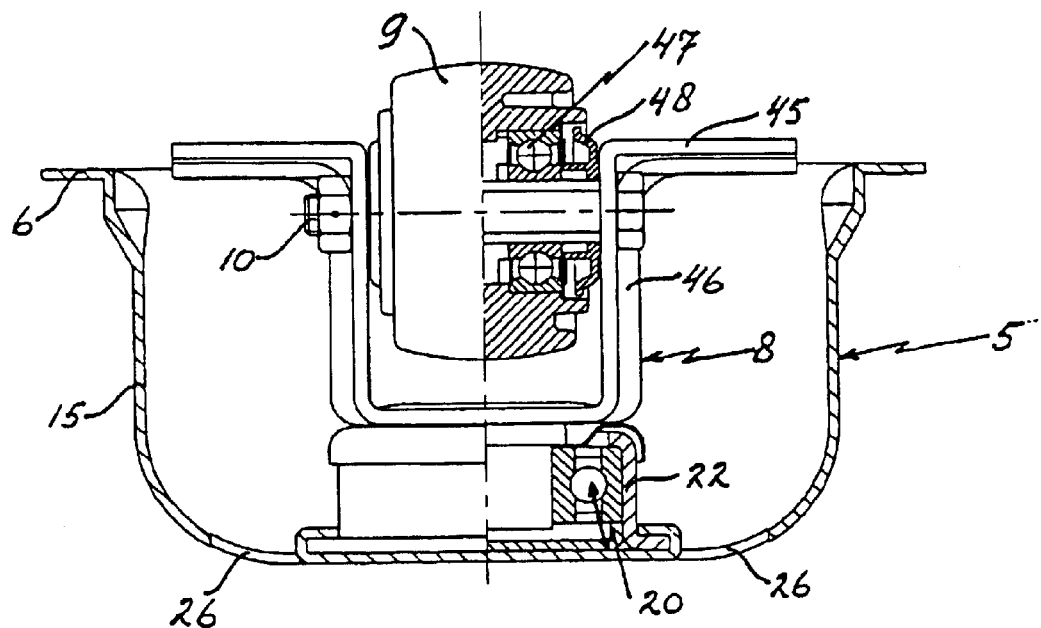
FIG. 7 is a cross sectional view of a swivel caster/device combination showing the application of two wheel bearings and an integrated safety-plate on the same wheel shaft.

FIG. 6 and FIG. 7 also partly show a cross-sectional view of the combination swivel caster 8 and devise 5 according to the invention. According to this embodiment the protection plate 41 which is in cross-section angular and detachable, is attached on to the wheel axle 10 against the legs 40 of the swivel fork 39. The legs 42 of the plate 41 are mounted against those of the swivel fork 39. Favourable is in this embodiment is the wheel shaft design whereby wheel 9 is attached to the wheel shaft 10 by means of the rolling bearing 43. The rolling bearing is fixed on the shaft by applying the cap 44. According to the embodiment of FIG. 7 the angularity shaped protection plate 45 is attached to the wheel shaft 10 and to the legs of the swivel fork 46 as well.

However, the wheel 9 is supported on the shaft 10 by two rolling bearings 47. Both rolling bearings 47 are provided by retaining caps 48 near the ends of the shaft.

The designs of the wheels and rolling bearings of the swivel casters as well as the protection plates depend on the demands that are made of the transportation system; e.g. for moving and/or manoeuvring relatively heavy containers transportation systems with double executed swivel casters will be preferred.

A protection plate, for that purpose, may have any suitable shape and be manufactured of suitable material e.g. metal or artificial fibre. Distinctive of this requirement always is that the plate swivels along with wheel and fork such that it e.g. prevents injuries of operating personnel by foot entering into the swivel caster. Further preventing penetrating of coarse material and therefore causing damages of the swivel caster.

The invention, for that matter, is not limited to the embodiments as shown; e.g. a devise 5 according to its cross-section may have a flattened or trapezium hat shape or possess a polygonal shape and/or be manufactured from suitable material, for instance steel or artificial fibre framework and therefore be lighter in weight. It is, however, decisive that the devise 5 is always sufficiently strong and stiff to be able to guarantee a reliable functioning of the swivel casters and finally of the transportation system and still is easy to handle when removing it from or placing it on the system.

What is claimed is:

1. A swivel caster for a transportation system including an upper platform wherein the swivel caster comprises:
   a wheel secured on a wheel-shaft by means of a first rolling bearing;
   a swivel fork attached at legs thereof to the wheel-shaft near ends of the wheel-shaft; and
   a support and enclosure device interconnected via a second rolling bearing to the swivel fork wherein the device has an upper opening with an edge configured such that the device can be attached to the upper platform and such that the wheel partially extends through the upper opening and above an upper surface of the upper platform and wherein the bottom of the device is provided with plurality of bottom openings having edges which are bent so as to engage the second rolling bearing so as to interconnect the device to the second rolling bearing and swivel fork and such that replacement of the entire swivel caster will be carried out by removing device from the upper platform.

2. The swivel caster of claim 1, wherein the device defines a deepened block-shaped contour.

3. The swivel caster of claim 1, wherein the device in cross-section has the shape of a relatively thin-walled bowl and wherein the edge is provided with holes via which the device can be connected with the upper platform.

4. The swivel caster of claim 1, further comprising a plate connected to at least one of the wheel-shaft and the swivel fork and wherein the plate is configured such that the plate and wheel together substantially occlude the upper opening.

5. The swivel caster of claim 4, wherein the connection of the plate to at least one of the wheel-shaft and the swivel fork is a detachable connection.

6. The swivel caster of claim 4, wherein a supporting element of the swivel fork is attached to a journal to which the second rolling bearing is connected and develops from it into the plate.

7. The swivel caster of claim 1, wherein the swivel fork is connected to the second rolling bearing via a welded seam.

8. The swivel caster of claim 1, wherein the bottom openings are positioned and configured to provide an exit path for water or debris which may enter the device.

9. The swivel caster of claim 1, wherein at least one of the first and second rolling bearings comprise sealed rolling bearings.

* * * * *

UNITED STATES PATENT AND TRADEMARK OFFICE
CERTIFICATE OF CORRECTION

PATENT NO. : 6,854,159 B2
DATED : February 15, 2005
INVENTOR(S) : Ruitenbeek

It is certified that error appears in the above-identified patent and that said Letters Patent is hereby corrected as shown below:

Title page,
Item [56], References Cited, FOREIGN PATENT DOCUMENTS, delete "B65G/1/08" and insert -- B65G/01/08 --.

Column 6,
Line 5, after "with" insert -- a --.
Line 10, after "removing" insert -- the --.

Signed and Sealed this

Fourth Day of October, 2005

JON W. DUDAS
*Director of the United States Patent and Trademark Office*